A. JEFFERYS.
EXPANSION MANDREL.
APPLICATION FILED JAN. 7, 1909.
966,449.
Patented Aug. 9, 1910.
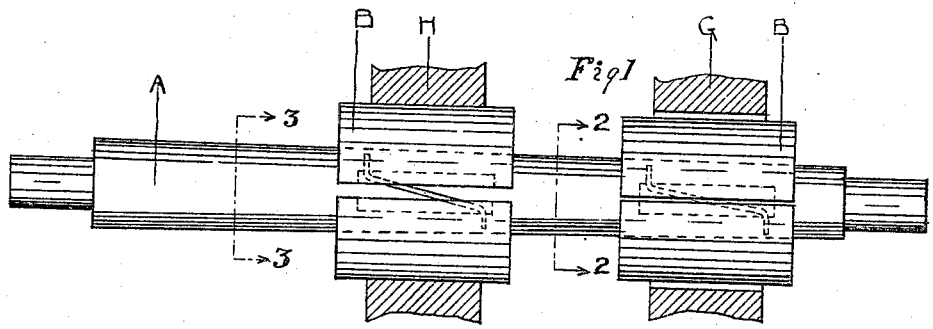
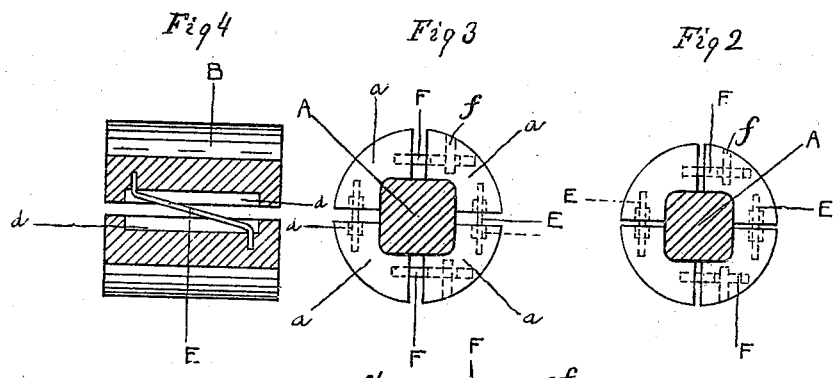
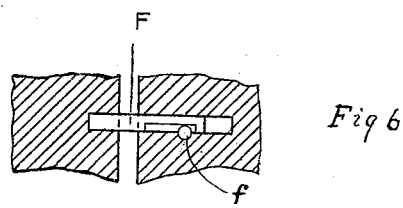
WITNESSES:
Albert Jefferys INVENTOR
BY
ATTORNEY.

UNITED STATES PATENT OFFICE.

ALBERT JEFFERYS, OF PHILADELPHIA, PENNSYLVANIA.

EXPANSION-MANDREL.

966,449.

Specification of Letters Patent. Patented Aug. 9, 1910.

Application filed January 7, 1909. Serial No. 471,064.

*To all whom it may concern:*

Be it known that I, ALBERT JEFFERYS, a citizen of the United States of America, residing at Philadelphia, in the county of Philadelphia and State of Pennsylvania, have invented certain new and useful Improvements in Expansion - Mandrels, of which the following is a specification.

My invention relates to improvements in expansion mandrels for use on milling and grinding machines, lathes, planers, etc., designed to admit of expansion to fit different diameters of borings, etc., and has for its object the reduction of parts and an increase of simplicity and strength over present inventions of its nature in use.

In the drawings Figure 1 is a side view of a mandrel with two bushings, one fully expanded and the other not yet expanded. Fig. 2 is a sectional view on the line 2—2 of Fig. 1 looking in the direction of the arrows. Fig. 3 is a similar section on the line 3—3 of Fig. 1. Fig. 4 is a section through the bushing of Fig. 3 on a plane dividing the chamber of the spring E thereof. Fig. 5 is a transverse section through the bushing showing the chamber containing the pin F. Fig. 6 is a section similar to that of Fig. 4, through the same chamber as in Fig. 5 but at right angles thereto.

I attain these objects by the construction shown and described in the attached drawings and following specifications, in which similar letters refer to similar parts in the several views.

A, Fig. 1, is a tapered four sided mandrel with a flexible segmental bushing B designed to slide thereon, said bushing consisting of four angle jaws *a a a a* held in position by alternate springs E and locking pins F. The inner surfaces of the angle jaws of bushing are made at an angle equal to that of taper of mandrel; the object being to cause their outside surfaces to move and expand at all times during movement of tool parallel with axis of mandrel.

To secure an even expansion of mandrel and to prevent one or more of sections or angle jaws of bushing from advancing beyond its mates when being placed in work, I provide on the longitudinal flat sides of said angle jaws, grooves or channels *d d* Figs. 3 and 4, in each of which a longitudinal spring E preferably of wire as shown is placed, the opposite ends of which are suitably secured to opposite angle jaws. In some work these springs would serve to a full extent the end desired, namely that of keeping the extremities of the jaws in the same tangential plane, for in order to afford greater strength in some work and to provide better alinement, I prefer to use an alternate combination of springs and locking pins as shown in Figs. 2 and 3 at F F and E E. In Figs. 5 and 6 said locking pins are shown in more detail on a larger scale. One end of the pin F is permanently fixed in one of the jaws as at *f'* while the other end slides freely in a recess $f^2$ in the opposite jaw, and is limited in its outward movement by the key-pin *f*. These locking pins and springs may be of various forms; I have shown what I consider the simplest and most practical in my drawings.

My mandrel may be made round, square, triangular, pentagonal, hexagonal or with any number of sides, but for simplicity I prefer the square form with slightly rounded corners as shown in Figs. 1 and 3 at A and of such taper as will reduce to a minimum the chances of bushing slipping while in work.

Operation of mandrel is simple and will be obvious from a reference to drawings in which G Fig. 1 represents work to be turned, ground, etc., and mandrel in position in bore before being driven in, and in same Fig. 1 the mandrel is shown expanded in work H and ready to be placed in machine.

I am aware that certain non-essential changes may be made without departing from the scope of my invention, as for example in the shape of the mandrel, in the nature of the springs employed, and the like. I wish it understood therefore that I contemplate all such changes as fall fairly within the scope of the appended claims.

What I claim and desire to secure by Letters Patent is:—

1. In an expansion mandrel, the combination of a tapered spindle having flattened sides, and a bushing thereon having a tapered bore shaped in cross section to fit the spindle and composed of a plurality of segments forming when closed a cylindrical figure divided on planes radial to the axis of the spindle, each adjacent pair of segments provided with registering chambers in their parallel contiguous faces, and holding means seated in said chambers, each holding means having one end secured to one segment, and its opposite end secured to the opposite segment, all substantially as described.

2. An expansion mandrel comprising a tapered spindle regular in cross section, and a segmental bushing having a tapered bore fitted to the spindle, and when closed a cylindrical external surface, the segments being divided on planes radial to the axis of the spindle, and each adjacent pair of segments having chambers formed in their juxtaposed faces, with holding means comprising compression springs lying partially in each chamber, and secured at opposite ends to the opposite segments, substantially as described.

3. An expansion mandrel comprising a tapered spindle of regular shape in cross section, a segmental bushing having a tapered bore to fit the spindle, and when closed externally cylindrical in figure, the segments being divided on planes radial to the axis of the spindle, and each pair of segments connected across the line of separation by a spring extending substantially from end to end of the bushing, and with one of its ends secured to one segment and the other end secured to the opposite segment, substantially as described.

4. An expansion mandrel comprising a tapered spindle of regular shape in cross section, and a segmental bushing having a tapered bore to fit the spindle and when closed externally cylindrical in figure, with holding means and steady pins connecting opposite pairs of segments, substantially as described.

5. An expansion mandrel comprising a tapered spindle of regular shape in cross section, a segmental bushing with a tapered bore to fit said spindle, with holding means between the adjacent segments comprising springs extending longitudinally of the bushing with their opposite ends secured to the opposite segments, and steady pins extending from one segment into another, substantially as described.

In testimony whereof I hereto affix my signature in presence of two witnesses.

ALBERT JEFFERYS.

Witnesses:
HERVEY J. SHERER.
HEPNER F. VAN HORN.